US012732074B2

(12) United States Patent
Peddi et al.

(10) Patent No.: US 12,732,074 B2
(45) Date of Patent: Sep. 8, 2026

(54) INDUCTION ELECTRIC MOTOR WITH FLUX INJECTION IN MULTIPLE REFERENCE FRAMES

(71) Applicant: GM GLOBAL TECHNOLOGY OPERATIONS LLC, Detroit, MI (US)

(72) Inventors: Vinod Chowdary Peddi, Shelby Township, MI (US); Song He, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 742 days.

(21) Appl. No.: 18/176,650

(22) Filed: Mar. 1, 2023

(65) Prior Publication Data

US 2024/0297558 A1 Sep. 5, 2024

(51) Int. Cl.

| | |
|---|---|
| ***H02P 8/18*** | (2006.01) |
| ***H02K 11/33*** | (2016.01) |
| ***H02K 17/30*** | (2006.01) |
| ***H02P 8/08*** | (2006.01) |

(52) U.S. Cl.

CPC ............. *H02K 17/30* (2013.01); *H02K 11/33* (2016.01)

(58) Field of Classification Search

CPC .. H02P 21/06; H02P 27/06; H02P 6/10; H02P 21/14; H02P 21/0003; H02P 21/13; H02P 21/32; H02P 2203/11; H02P 29/032; H02P 6/183; H02P 6/185; H02P 23/14; H02P 21/00; H02P 21/141; H02P 5/74; H02P 21/36

See application file for complete search history.

(56) References Cited

U.S. PATENT DOCUMENTS

2009/0251096 A1* 10/2009 Schulz .................... H02P 27/08 318/432

2011/0089882 A1* 4/2011 Yeh ...................... G01R 31/343 180/65.285

* cited by examiner

*Primary Examiner* — Kawing Chan
*Assistant Examiner* — Charles S Laughlin
(74) *Attorney, Agent, or Firm* — Quinn IP Law

(57) ABSTRACT

A propulsion system for an electric vehicle includes an induction electric motor configured to generate torque for propulsion. The system includes a controller having a processor and tangible, non-transitory memory on which instructions are recorded for a method of suppressing tonal noises in a predefined motor speed range of the electric motor. The controller is adapted to simultaneously inject flux harmonics through respective injections in a rotor reference frame, a first flux reference frame and a second flux reference frame. The rotor reference frame is based in part on a rotor bar order and a rotor position. The first flux reference frame is based in part on a first induction order, the rotor position and a slip position. The second flux reference frame is based in part on a second induction order, the rotor position and the slip position.

13 Claims, 4 Drawing Sheets

INDUCTION ELECTRIC MOTOR WITH FLUX INJECTION IN MULTIPLE REFERENCE FRAMES

INTRODUCTION

The disclosure relates generally to a propulsion system for a device having an induction electric motor. More specifically, the disclosure relates to flux injections in multiple reference frames for tonal noise suppression in an induction electric motor. The use of purely electric vehicles and hybrid vehicles, such as battery electric vehicles and fuel cell hybrid electric vehicles, has greatly increased over the last few years. Propulsion for the hybrid electric vehicles and other electric-powered transportation devices may be provided by electric motors. The performance of electric motor varies over time due to a number of factors. In many electric-powered machines, it is challenging to minimize tonal noise while continuing to meet high torque demands. This challenge is further complicated in asynchronous machines such as induction machines, due to non-integer orders and multiple noise sources.

SUMMARY

Disclosed herein is a propulsion system for an electric vehicle. The propulsion system includes an induction electric motor configured to generate torque to propel the device, the induction electric motor having a rotor and a stator. A controller is in communication with the induction electric motor and has a processor and tangible, non-transitory memory on which instructions are recorded for a method of suppressing tonal noises in a predefined speed range. The controller is adapted to inject flux harmonics simultaneously through respective voltage injections in a plurality of reference frames, including a rotor reference frame, a first flux reference frame and a second flux reference frame. The rotor reference frame is based in part on a rotor bar order and a rotor position of the rotor. The first flux reference frame is based in part on a first induction order, the rotor position and a slip position. The second flux reference frame is based in part on a second induction order, the rotor position and the slip position.

The controller is configured to obtain a respective angular position of the rotor reference frame ($\theta_1$) as $\theta\mathbf{1}=(H_1*\theta_r)$, where $H_1$ is the rotor bar order and $\theta_r$ is the rotor position. The rotor bar order is defined as a ratio of a number of rotor bars in the rotor to the number of pole pairs. The controller is configured to obtain the respective angular position of the first flux reference frame ($\theta_2$) as $\theta_2=H_2*(\theta_r+\theta_s)$, where $H_2$ is the first induction order, $\theta_{sl}$ is the slip position and $\theta_r$ is the rotor position. The controller is configured to obtain the respective angular position of the second flux reference frame ($\theta_3$) as: $\theta_3=[(H_3*\theta_r)-(2*\theta_{sl})]$, where $H_3$ is the second induction order, $\theta_{sl}$ is the slip position and $\theta_r$ is the rotor position. The first induction order and the second induction order are based in part on a number of phases, stator slots and pole pairs in the induction electric motor.

In one embodiment, the rotor bar order, the first induction order and the second induction order each have an identical value. In another embodiment, the rotor bar order, the first induction order and the second induction order each have different values. In another embodiment, the first induction order and the second induction order have an identical value and the rotor bar order has a different value. The controller may be configured to respectively vary a flux harmonics magnitude and a flux harmonics phase in the plurality of reference frames based on a commanded torque and a motor speed.

Disclosed here is a method of suppressing tonal noises in a propulsion system having an induction electric motor with a rotor and a stator, and a controller with a processor and tangible, non-transitory memory. The method includes generating torque for propulsion via the induction electric motor. The method includes injecting flux harmonics through a respective voltage injection simultaneously in a plurality of reference frames, including a rotor reference frame, a first flux reference frame and a second flux reference frame. The method includes selecting the rotor reference frame based in part on a rotor bar order and a rotor position of the rotor. The method includes selecting the first flux reference frame based in part on a first induction order, the rotor position and a slip position and selecting the second flux reference frame based in part on a second induction order, the rotor position and the slip position.

The above features and advantages and other features and advantages of the present disclosure are readily apparent from the following detailed description of the best modes for carrying out the disclosure when taken in connection with the accompanying drawings.

Figure 1:
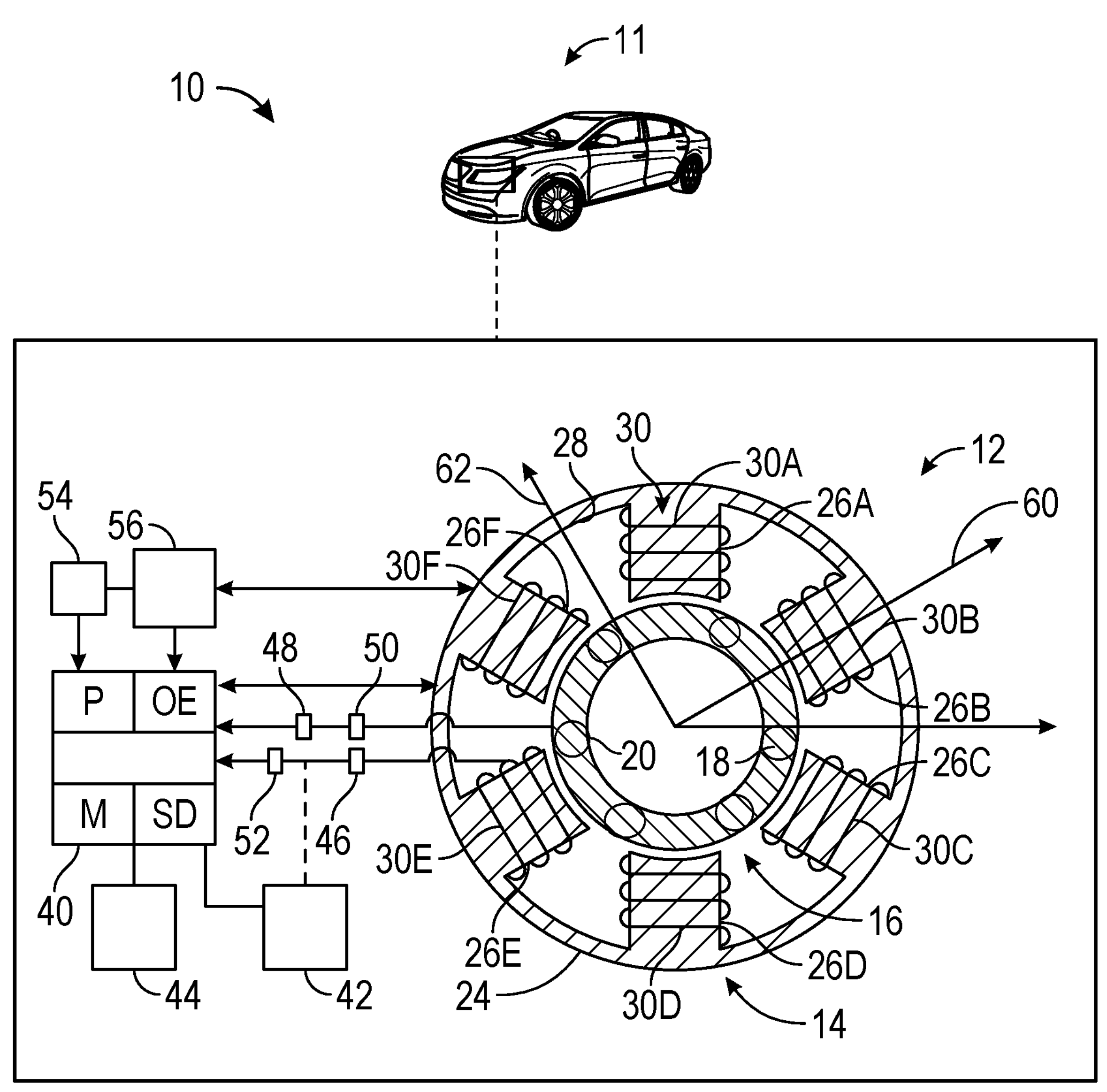
FIG. 1 is a schematic fragmentary partly sectional view of a propulsion system for a device having an electric motor and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a propulsion system 10 for a device 11. The device 11 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The device 11 may be an electric vehicle. The device 11 may take many different forms and include multiple and/or alternate components and facilities.

Referring to FIG. 1, the device 11 includes an electric motor 12 having a stator 14 and a rotor 16. The rotor 16 includes rotor bars 18 positioned within respective rotor slots 20 and arranged circumferentially in a disk/lamination. Each of the rotor slots 20 is configured to receive one of the rotor bars 18. The rotor bars 18 may be composed of a suitable conducting material, including but not limited to, copper, aluminum, iron etc. The rotor 16 defines an electrical speed or motor speed ($\omega_e$) and a mechanical frequency ($\omega_m$), which are related as ($\omega_e$=PP*$\omega_m$), where PP is the number of pole pairs. It is understood that the number of rotor bars or pole pairs may be varied.

Referring to FIG. 1, the stator 14 includes a stator core 24 which may be cylindrically shaped with a hollow interior. The stator core 24 may include a plurality of inwardly protruding stator teeth 26A-F, separated by gaps or slots 28. In the embodiment shown in FIG. 1, stator windings 30 may be operatively connected to the stator core 24, such as for example, being coiled around the stator teeth 26A-F. Referring to FIG. 1, the stator windings 30 may include six sets of windings; one set for each of three phases (the first phase through stator windings 30A and 30D, the second phase through stator windings 30B and 30E and the third phase through stator windings 30C and 30F).

The current in the stator windings 30 produce a rotating magnetic field which sweeps past the rotor bars 18 and induces an electromotive force in them. As a result, an induced current flows in the rotor bars 18, establishing a magnetic field that interacts with the magnetic field of the stator core 24. The electric motor 12 is an induction machine with a slip or a difference between the stator field speed and the rotor speed. While an example electric motor 12 is shown, the components illustrated in the FIG. are not intended to be limiting. Indeed, additional or alternative components and/or implementations may be used.

Referring to FIG. 1, the propulsion system 10 includes a controller 40 in communication, such as electronic communication, with the electric motor 12. Referring to FIG. 1, the controller 40 may include an online torque estimation module OE and a stored data module SD. The electric motor 12 is configured to generate torque to propel the device 11, for example, through one or more wheels 42. The propulsion system 10 may include a secondary source 44, such as an internal combustion engine, configured to selectively provide a secondary torque contribution to propel the device 11, through the wheels 42, for example.

The electric motor 12 produces a torque signal in response to a torque command. The harmonics of the flux density in the electric motor 12 generate oscillating field forces at specific spatial orders, which cause vibration excitations resulting in torque ripple leading to acoustic noise. The vibrations are the result of magnetic flux density harmonics in the airgap of an electric motor 12. Electromagnetic forces in the air gap may be evaluated from the flux density. At high electrical speeds or frequencies, the radial forces are dominant and tangential forces may be ignored.

The harmonics present in the force distribution along the air gap cause vibration excitations resulting in undesired tonal noises of specific spatial orders in alternating current machines. To improve the acoustics, these force distributions can be compensated by superposition of a phase-shifted force of the same spatial order by use of appropriate flux linkage. However, this is complicated in asynchronous electric motors (such as induction motors) due to non-integer orders and varying noise sources, ranging from mechanical rotor bar orders and induction orders caused by stator and rotor flux.

As described below, the system 10 improves acoustic noise behavior through flux injections in the airgap of an induction electric motor 12. The controller 40 includes at least one processor P and at least one memory M (or non-transitory, tangible computer readable storage medium) on which are recorded instructions for executing a method 100, shown in FIG. 2, for simultaneously suppressing tonal noises caused by rotor bar harmonics and air gap force harmonics. This is achieved by creating multiple reference frames, including a rotor bar reference frame at a particular spatial order, a first flux reference frame and a second flux reference frames for a particular spatial order. The system 10 enables injection of air gap flux harmonics through respective voltage injections in the aforementioned reference frames to simultaneously and/or independently achieve tonal noise suppression for a wide speed range. For a four pole pair induction machine at 300 volts Vdc, the speed range may extend from zero to 6000 RPM. The memory M can store controller-executable instruction sets, and the processor P can execute the controller-executable instruction sets stored in the memory M.

The controller 40 of FIG. 1 is specifically programmed to execute the blocks of the method 100 (as discussed in detail below with respect to FIG. 2) and may receive inputs from one or more sensors. Referring to FIG. 1, the propulsion system 10 may include a temperature sensor 46, a magnet flux linkage observer 48, and a position sensor 50, each capable of measuring a respective physical factor and sending a respective signal to the controller 40. As alternative to physical sensors, virtual software replacements may be used. Additionally, controller 40 may be programmed to determine the respective physical factors by inputting the respective signals into a model or other estimation technique available to those skilled in the art. The propulsion system 10 may include a current sensor 52 that generates a current ripple signal. Referring to FIG. 1, a direct current (DC) power source 54 is configured to provide a DC link voltage (Vac) to the electric motor 12. A pulse width modulated (PWM) inverter 56 may be operatively connected to the controller 40 (and the DC power source 54) and configured to convert DC current to alternating (AC) current.

Figure 2:
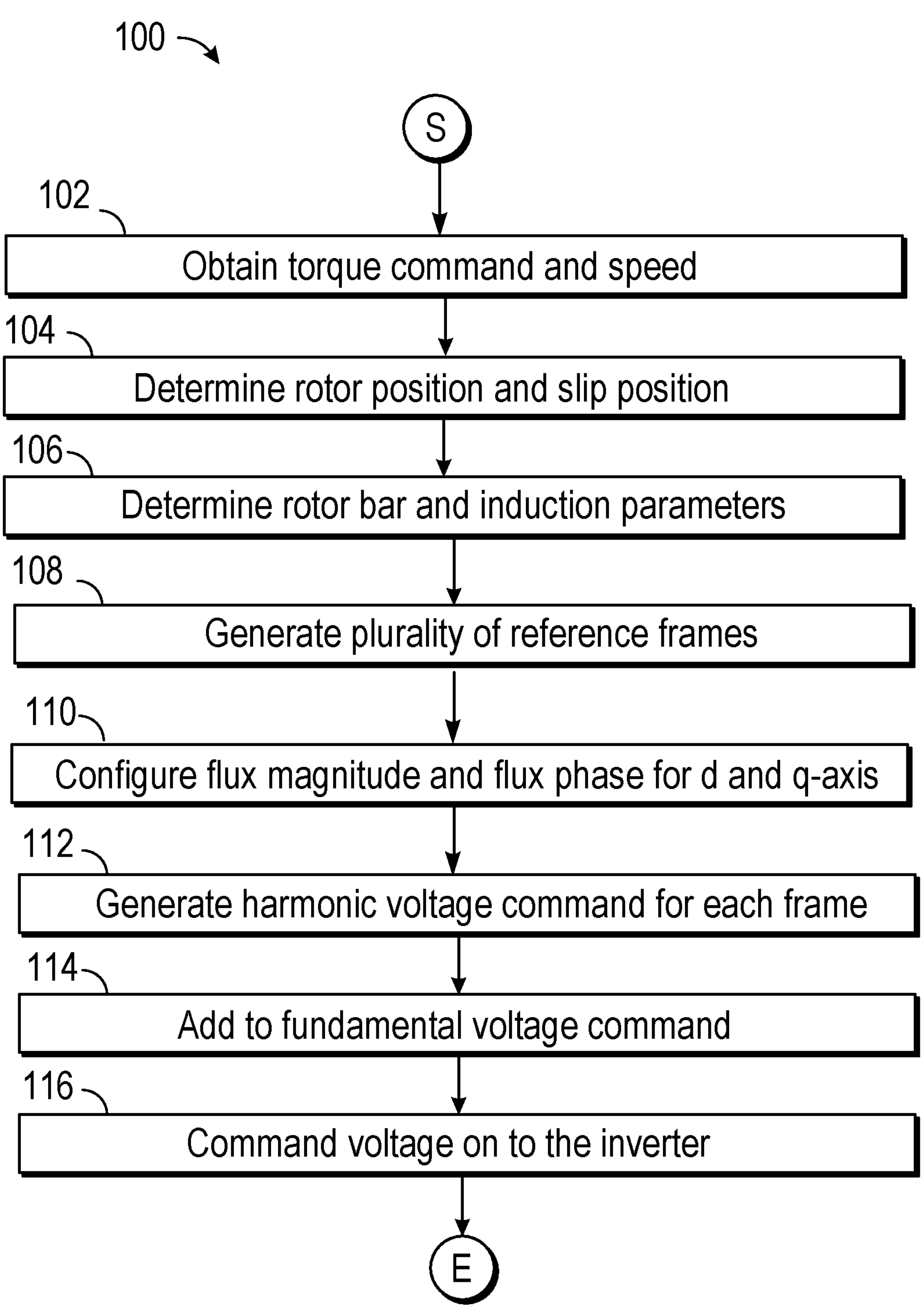
FIG. 2 is a flowchart for a method executable by the controller of FIG. 1.

Referring now to FIG. 2, an example flowchart of the method 100 is shown. Method 100 may be embodied as computer-readable code or instructions stored on and partially executable by the controller 40 of FIG. 1. Method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Force distribution $f_d(t, \theta)$ along the airgap of an alternating current machine may be described in a Fourier series by the superposition of excitation modes v up to the $U^{th}$ spatial component as indicated below:

$$f_d(t,\theta)=\sum\nolimits_{v=0}^{U}(f_{cos,d,v}(t)\cos(v\theta)+f_{sin,d,v}(t)\cos(v\theta)).$$

Here θ is the angular position in the airgap, index d denotes the direction (whether radial or tangential) and v indicates the force excitation mode shape. The harmonics present in the force distribution along the air gap cause vibration excitations resulting in undesired tonal noises of specific spatial orders in AC machines. To improve the acoustics, these force distributions are altered by superposition of a phase-shifted force of the same spatial order by use of appropriate flux linkage or direct voltage injection.

Beginning at block 102, the method 100 includes obtaining the commanded torque ($T_e$) and the motor speed ($\omega_e$), e.g., from various sensors in the device 11. Advancing to block 104, the controller 40 is adapted to determine the position of the rotor 16. The rotor position ($\theta_r$) may be determined as: $\theta_r$=PP*$\theta_{raw}$, where $\theta_{raw}$ is a raw mechanical position (e.g., from a sensor such as the position sensor 50) and PP is the number of pole pairs.

Also, per block 104, the method 100 includes estimating a slip position ($\theta_{sl}$). The flux position (or electrical angle position) may be obtained as a sum of the rotor position ($\theta_r$) and a slip position ($\theta_{sl}$) as follows: [$\theta_e=\theta_r+\theta_{sl}$]. The slip position ($\theta_{sl}=\int\omega_{sl}$) is an integral of the slip frequency. The slip frequency may be defined as the difference between the stator electrical frequency and the rotor electrical frequency. When a flux-oriented control method is used, the stator frequency is the same as the rotor flux frequency. Here, the slip frequency may be defined as a difference between a motor speed ($\omega_e$) and rotor frequency ($\omega_r$) as: [$\omega_{sl}=\omega_e-\omega_r$], where $$[\omega_r = \frac{d}{dt}\theta_r].$$

Additionally, the slip frequency may be expressed with some motor parameters, the stator current and the rotor flux as:

$$[\omega_{sl} = \frac{R_r}{L_r}L_m\frac{I_{qs}^e}{\lambda_{dr}^e}].$$

Here $L_r$ and $L_m$ are the rotor and the magnetizing inductances, respectively, $R_r$ is the rotor resistance, $$I_{qs}^e$$

is the q-axis stator current in the synchronous reference frame and $$\lambda_{dr}^e$$

is the d-axis rotor flux in the synchronous reference frame. Referring to FIG. 1, a quadrature magnetic axis 60 (referred to herein as q-axis) and a direct magnetic axis 62 (referred to herein as d-axis) are shown. The slip frequency here is based on the q-axis rotor voltage equation, equation (4), and the q-axis rotor flux linkage equation, equation (8), and assuming that the q-axis rotor flux and its time derivative are zeros.

Proceeding to block 106, the method 100 includes determining the rotor bar order ($H_1$), the first induction order ($H_2$) and the second induction order ($H_3$). The rotor bar order ($H_1$) is defined as the ratio of the number of rotor bars 18 in the rotor 16 to the number of pole pairs. For example, if there are 56 rotor bars and 4 pole pairs, the rotor bar order ($H_1$) will be 14.

The first induction order and the second induction order may be selected based in part on a number of phases, stator slots and pole pairs in the electric motor 12 and the orders producing the most noise in those configurations (e.g., through noise data). For example, in a 3 phase, 96 slot machine with 4 pole-pairs, the induction orders in the mechanical domain are 4*h, where h can be harmonics of 6 such as 6, 12, 18 etc. in the electrical angle domain. These correspond to the 24th, 48th and 72nd mechanical orders. In other words, while the rotor bar order ($H_1$) is a function of rotor bars and pole pairs, the first induction order ($H_2$) and the second induction order ($H_3$) are based on electrical orders which may be ($H_2$, $H_3$=(6,6), (6,12), (12,18) or other possible combinations. In one embodiment, the rotor bar order, the first induction order and the second induction order each have an identical value, e.g., ($H_1$, $H_2$, $H_3$)=(6, 6, 6). The system 10 allows multiple harmonics to be simultaneously suppressed. In another embodiment, the rotor bar order, the first induction order and the second induction order each have different values, e.g., ($H_1$, $H_2$, $H_3$)=(14, 12, 18). Here, the harmonics 14, 12 and 18 are simultaneously being suppressed. In yet another embodiment, the first induction order and the second induction order have an identical value and the rotor bar order has a different value, e.g., ($H_1$, $H_2$, $H_3$)=(14, 12, 12). Here, the harmonics 14 and 12 are simultaneously being suppressed.

Advancing to block 108, the method 100 includes generating the rotor reference frame ($\theta_1$), the first flux reference frame ($\theta_2$) and the second flux reference frame ($\theta_3$), through their respective angular positions (ex). The controller 40 is configured to obtain a respective angular position ($\theta_1$) of the rotor reference frame as $\theta_1=(H_1*\theta_r)$, where $H_1$ is the rotor bar order and $\theta_r$ is the rotor position (from block 104).

The respective angular position ($\theta_2$) of the first flux reference frame is obtained as $\theta_2=H_2*(\theta_r+\theta_s)$, where $H_2$ is the first induction order, $\theta_s$ is the slip position (from block 104) and $\theta_r$ is the rotor position. The controller 40 is configured to obtain the respective angular position ($\theta_3$) of the second flux reference frame as: $\theta_3=[(H_3*\theta_r)-(2*\theta_{sl})]$, where $H_3$ is the second induction order, $\theta_{sl}$ is the slip position and $\theta_r$ is the rotor position.

Per block 110 of FIG. 2, the controller 40 is adapted to configure the flux magnitude and flux phase as a function of the commanded torque (Te) and the motor speed ($\omega_e$) for the d-axis and the q-axis. The d-axis and q-axis stator and rotor voltages in a reference frame synchronized to the rotor flux may be expressed as in equations (1) though to (4). Referring to FIG. 1, a quadrature magnetic axis 60 (referred to herein as q-axis) and a direct magnetic axis 62 (referred to herein as d-axis) are shown. In the embodiment here, the rotor 16 is a squirrel-cage rotor with the rotor voltages being zeros. The superscript e indicates that the quantity is expressed in a frame synchronized to the rotor flux.

$$V_{qs}^e = R_sI_{qs}^e + \frac{d}{dt}\lambda_{qs}^e + \omega_e\lambda_{ds}^e \quad (1)$$

$$V_{ds}^e = R_sI_{ds}^e + \frac{d}{dt}\lambda_{ds}^e - \omega_e\lambda_{qs}^e \quad (2)$$

$$V_{dr}^e = 0 = R_rI_{dr}^e + \frac{d}{dt}\lambda_{dr}^e - (\omega_e - \omega_r)\lambda_{qr}^e \quad (3)$$

$$V_{qr}^e = 0 = R_rI_{qr}^e + \frac{d}{dt}\lambda_{qr}^e + (\omega_e - \omega_r)\lambda_{dr}^e \quad (4)$$

Here, $$I_{ds}^e,$$

$$I_{qs}^e,$$

$$I_{dr}^e,$$

and $$I_{qr}^e$$

are the d- and q-axis stator and rotor currents in the synchronous reference frame, respectively; $R_s$ and $R_r$ are the stator and rotor resistance, and $\omega_e$ and $\omega_r$ are the electrical frequency of the rotor flux (rotor flux frequency) and the electrical frequency of the rotor (rotor electrical frequency), respectively. Additionally, $$\lambda_{ds}^e, \lambda_{qs}^e, \lambda_{dr}^e, \text{ and } \lambda_{qr}^e$$

are the d- and q-axis stator and rotor flux linkages in the synchronous reference frame that are expressed as in equations (5) through (8) below. Here $L_s$, $L_r$, and $L_m$ are the stator, rotor, and the magnetizing inductances, respectively.

$$\lambda_{ds}^e = L_s I_{ds}^e + L_m I_{dr}^e \quad (5)$$

$$\lambda_{qs}^e = L_s I_{qs}^e + L_m I_{qr}^e \quad (6)$$

$$\lambda_{dr}^e = L_m I_{ds}^e + L_r I_{dr}^e \quad (7)$$

$$\lambda_{qr}^e = L_m I_{qs}^e + L_r I_{qr}^e \quad (8)$$

The flux magnitude ($\lambda_{d,amp,Hx}, \lambda_{q,amp,Hx}$) and phase terms ($\delta_d$, $\delta_q$) along the d-axis and q-axis may be adjusted as a function of torque and speed (Te, $\omega_e$) for operating point variation in the plurality of reference frames (where $H_x=[H_1, H_2, H_3]$, $\theta_x=[\theta_1, \theta_2, \theta_3]$) as follows:

$$\lambda_{dq,Hx} = \begin{pmatrix} \lambda_{d,Hx} \\ \lambda_{q,Hx} \end{pmatrix} = \begin{pmatrix} \lambda_{d,amp,Hx}(Te, \omega_e) * \sin(\theta_x - \delta_d(Te, \omega_e)) \\ \lambda_{q,amp,Hx}(Te, \omega_e) * \cos(\theta_x - \delta_q(Te, \omega_e)) \end{pmatrix} \quad (9)$$

Here $\delta_d$(Te, $\omega_e$) and $\delta_q$(Te, $\omega_e$) denote the flux phase shift in the d and q-axes respectively as a function of the commanded torque (Te) and the motor speed ($\omega_e$). The torque may be obtained as $$T_e = [\frac{3}{2} PP \frac{L_m}{L_r} (\lambda_{dr}^e I_{qs}^e - \lambda_{qr}^e I_{ds}^e)],$$

where PP is the number of pole pairs. Alternatively, the voltage commands may be directly applied in the form of LUT (look up tables), with the following calculation in the plurality of reference frames (where $H_x=[H_1, H_2, H_3]$, $\theta_x=[\theta_1, \theta_2, \theta_3]$).

$$V_{dq,Hx} = \begin{pmatrix} V_{d,Hx} \\ V_{q,Hx} \end{pmatrix} = \begin{pmatrix} V_{d,amp,Hx}(Te, \omega_e) * \sin(\theta_x - \delta_d(Te, \omega_e)) \\ V_{q,amp,Hx}(Te, \omega_e) * \cos(\theta_x - \delta_q(Te, \omega_e)) \end{pmatrix} \quad (10)$$

Proceeding to block 112, the method 100 includes generating a harmonic voltage command for each of the plurality of reference frames. Tonal noise sources in induction machines span across multiple spatial harmonic orders. The command may be carried out through appropriate flux linkage or direct voltage injections. The voltage commanded by the controller 40 to mitigate tonal noises in the plurality of reference frames (where $H_x=H_1, H_2, H_3$) may be obtained as:

$$V_{dq\,Hx} = \begin{pmatrix} V_{d,Hx} \\ V_{q,Hx} \end{pmatrix} = [j\omega_x \lambda_{dq,Hx}].$$

Here $$j = \begin{bmatrix} 0 & -1 \\ 1 & 0 \end{bmatrix}$$

is a 90-degree rotational matrix, $$\omega_x = \left[\frac{d}{dt}\theta_x\right], \omega_x = [\omega_1, \omega_2, \omega_3],$$

$$\theta_x = [\theta_1, \theta_2, \theta_3],$$

and $\Delta_{dq,\,Hx}$ may be obtained from equation (9) above.

Proceeding to block 114, the harmonic voltage command is added to the fundamental voltage command. Advancing to block 116, the PWM signal is generated and applied to the PWM inverter 56. Also per block 116, operation of the device 11 (via the propulsion system 10) is controlled based on the PWM signal and the method 100 ends.

Figure 3:
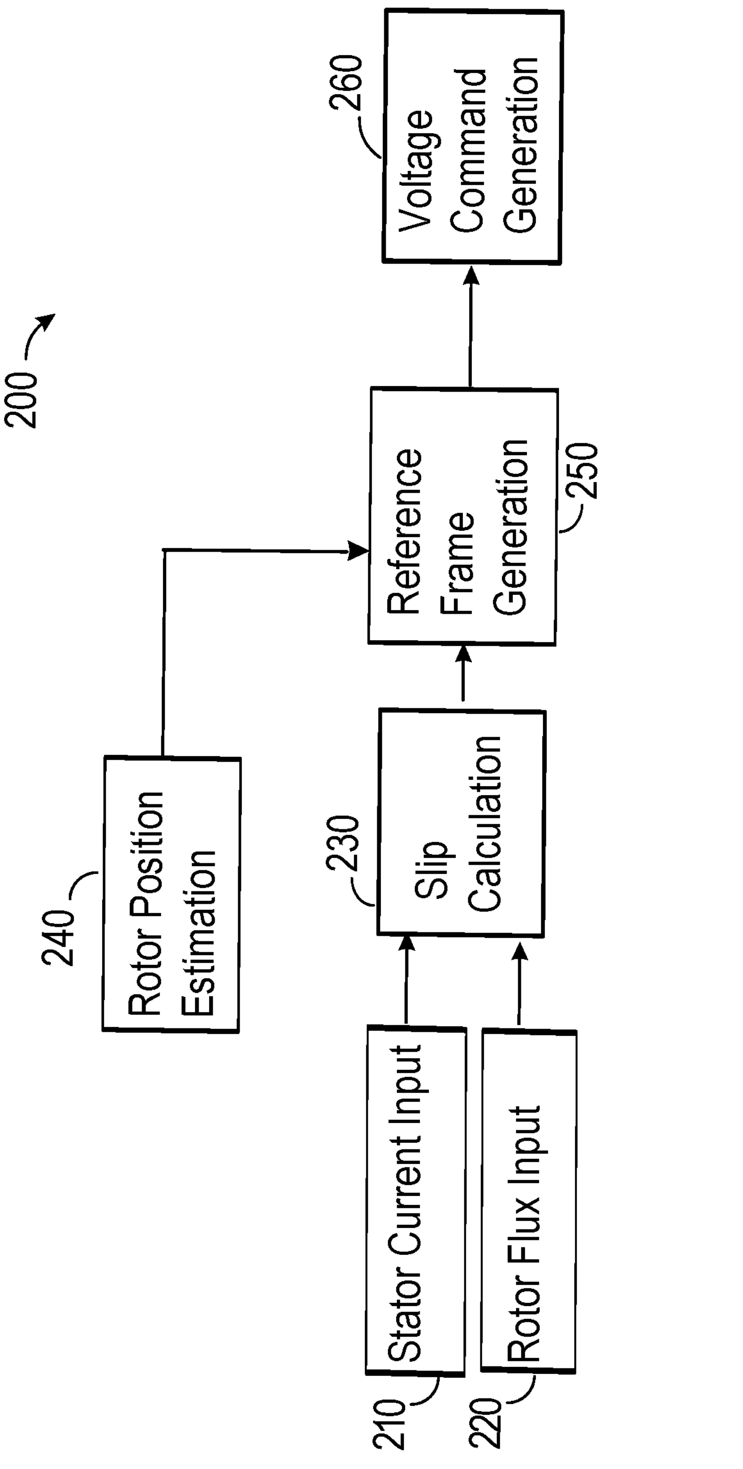
FIG. 3 is a schematic diagram of an example architecture employable by the system of FIG. 1.

An example architecture 200 employable by the system 10 is shown in FIG. 3. It is to be understood that other types of layouts or arrangements may be employed. Referring to FIG. 3, stator current data and rotor flux linkage data from a first input module 210 and a second input module 220, respectively, are transmitted to a slip calculation module 230. The output of the slip calculation module 230 and a rotor position estimation module 240 are transmitted to a reference frame generation module 250, which generates the plurality of reference frames. Referring to FIG. 3, the output of the reference frame generation module 250 is transmitted to a voltage command generation module 260, which generates the noise-cancellation voltage commands that will be subsequently applied to the PWM inverter 56.

Figure 4:
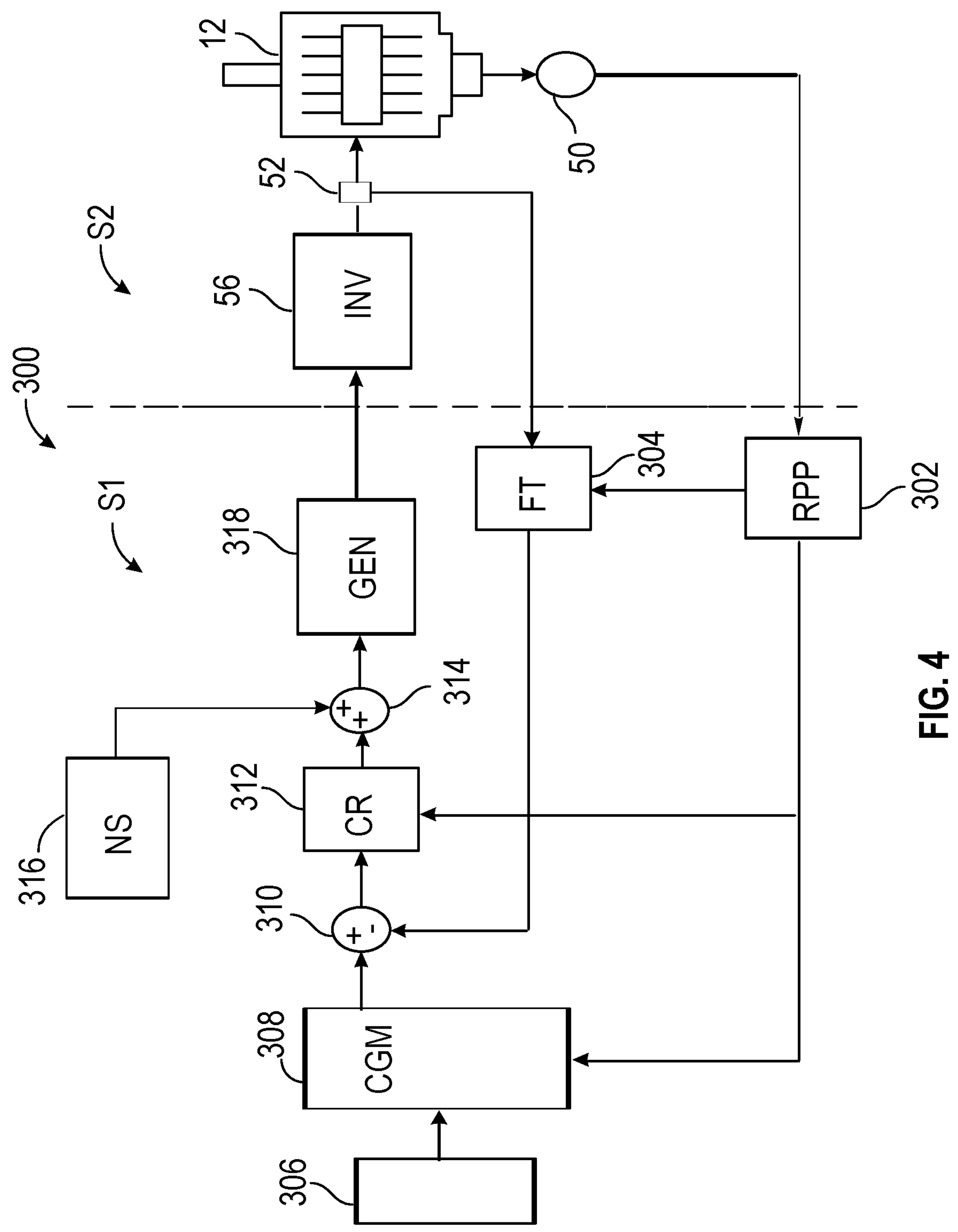
FIG. 4 is a schematic diagram of an example control system for implementing the method of FIG. 2.

Referring now to FIG. 4, a schematic diagram of an example control system 300 for implementing the method 100 (of FIG. 2) is shown. Referring to FIG. 4, a position sensor 50 is operatively connected to the electric motor 12. Raw mechanical position data ($\theta_{raw}$) is transmitted from the position sensor 50 to a rotor position processing module 302 ("RPP"). The rotor position processing module 302 computes parameters such as motor speed ($\omega_e$), rotor position ($\theta_r$), slip position ($\theta_{sl}$) and slip frequency ($\omega_{sl}$).

A current sensor 52 is operatively connected to the electric motor 12. The measured current from the current sensor 52 (and the output of the rotor position processing module 302) are transmitted to a frame transformer 304 for conversion from an abc frame of reference to the d-axis and q-axis frame ($I_{abc}$ to $I_{dq}$). The first side S1 of FIG. 4 represents discrete control system components while the second side S2 represents physical system components.

Referring to FIG. 4, data from an input module 306 is transmitted to a command generation module 308 ("CGM").

The data includes the commanded torque and the DC voltage. The command generation module 308 also receives motor speed input ($\omega_e$) from the rotor position processing module 302. The command generation module 308 generates a current command ($I_{dq}$*) based on the data/input and transmits it to a first summation junction 310.

Referring to FIG. 4, the first summation junction 310 receives the output of the frame transformer 304 and subtracts from it the output of the command generation module 308. The resulting output of the first summation junction 310 goes to a current regulator 312 ("CR") which determines the torque commands for the fundamental frequency based on motor speed input (from the rotor position processing module 302) and the output of the first summation junction 306.

Referring to FIG. 4, a second summation junction 314 adds the output ($V_{dq,f}$*) of the current regulator 312 and a tonal noise suppression module 316. The tonal noise suppression module 316 transmits the data obtained via the execution of method 100, including the harmonic voltage command ($V_{dqHx}$*). The output of the second summation junction 314 is sent to a PWM generator 318 ("GEN"), which transmits it to the PWM inverter 56 and the electric motor 12. This example pertains to motoring operation, however, it is understood that similar principles apply when the drive system is operating in regeneration mode. It is to be understood that other types of layouts or arrangements may be employed.

In summary, the propulsion system 10 enables injection of flux harmonics in multiple reference frames simultaneously, the injections being configurable for an asynchronous electric motor 12 based in part on rotor bars, slots and pole pairs. The system 10 allows multiple harmonics to be simultaneously suppressed. The system 10 may simultaneously target rotor bar spatial orders and multiple induction orders at the same spatial order. The method 100 provides variation of flux harmonics magnitude and phase based on operating point (e.g., torque and motor speed) in multiple reference frames for consistent tonal noise suppression. The method 100 enables noise suppression and improved drive quality in a wide range of motor speed.

The controller 40 of FIG. 1 may be an integral portion of, or a separate module operatively connected to, other controllers of the device 11. The controller 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart shown in the FIGS. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of orders (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such orders. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A propulsion system for an electric vehicle, comprising:

an induction electric motor configured to generate torque for propulsion, the induction electric motor having a rotor and a stator;

a controller in communication with the induction electric motor and having a processor and tangible, non-transitory memory on which instructions are recorded for a method of suppressing tonal noises in a predefined motor speed range;

a pulse width modulated (PWM) inverter operatively connected to the controller;

wherein the controller is adapted to simultaneously inject flux harmonics through a respective voltage injection in a plurality of reference frames, including a rotor reference frame, a first flux reference frame and a second flux reference frame;

wherein the controller is adapted to generate a PWM signal based in part on the flux harmonics, the controller being adapted to control operation of the electric vehicle based on the PWM signal, including applying the PWM signal to the PWM inverter;

wherein the rotor reference frame is based in part on a rotor bar order and a rotor position of the rotor;

wherein the first flux reference frame is based in part on a first induction order, the rotor position and a slip position;

wherein the second flux reference frame is based in part on a second induction order, the rotor position and the slip position;

wherein the first induction order and the second induction order are respective electrical harmonic orders associated with stator-induced electromagnetic excitations in the induction electric motor, the first induction order and the second induction order being selected based in part on a number of phases, stator slots and pole pairs in the induction electric motor;

wherein the controller is adapted to:

obtain a respective angular position of the rotor reference frame ($\theta_1$) as $\theta_1=(H_1*\theta_r)$, where $H_1$ is the rotor bar order and $\theta_r$ is the rotor position, the rotor bar order being defined as a ratio of a number of rotor bars in the rotor to the number of pole pairs; and obtain the respective angular position of the first flux reference frame ($\theta_2$) as $\theta_2=H_2*(\theta_r+\theta_s)$, where $H_2$ is the first induction order, $\theta_{sl}$ is the slip position and $\theta_r$ is the rotor position.

2. The propulsion system of claim 1, wherein the controller is configured to obtain the respective angular position of the second flux reference frame ($\theta_3$) as: $\theta_3=[(H_3*\theta_r)-(2*\theta_{sl})]$, where $H_3$ is the second induction order, $\theta_{sl}$ is the slip position and $\theta_r$ is the rotor position.

3. The propulsion system of claim 2, wherein the rotor bar order, the first induction order and the second induction order each have an identical value.

4. The propulsion system of claim 2, wherein the rotor bar order, the first induction order and the second induction order each have different values.

5. The propulsion system of claim 2, wherein the first induction order and the second induction order have an identical value and the rotor bar order has a different value.

6. The propulsion system of claim 2, wherein the controller is configured to respectively vary a flux harmonics magnitude and a flux harmonics phase in the plurality of reference frames based on a commanded torque and a motor speed.

7. A method of suppressing tonal noises in a propulsion system having an induction electric motor with a rotor and a stator, a pulse width modulated (PWM) inverter, and a controller with a processor and tangible, non-transitory memory, the method comprising:

generating torque for propulsion via the induction electric motor;

injecting flux harmonics through a respective voltage injection simultaneously in a plurality of reference frames, including a rotor reference frame, a first flux reference frame and a second flux reference frame;

generate a PWM signal based in part on the flux harmonics;

controlling operation of the electric vehicle based on the PWM signal, including applying the PWM signal to the PWM inverter;

selecting the rotor reference frame based in part on a rotor bar order and a rotor position of the rotor;

selecting the first flux reference frame based in part on a first induction order, the rotor position and a slip position;

selecting the second flux reference frame based in part on a second induction order, the rotor position and the slip position, wherein the first induction order and the second induction order are respective electrical harmonic orders associated with stator-induced electromagnetic excitations in the induction electric motor, the first induction order and the second induction order being selected based in part on a number of phases, stator slots and pole pairs in the induction electric motor;

obtaining a respective angular position of the rotor reference frame ($\theta_1$) as $\theta_1=(H_1*\theta_r)$, where $H_1$ is the rotor bar order and $\theta_r$ is the rotor position, the rotor bar order being defined as a ratio of a number of rotor bars in the rotor to the number of pole pairs, via the controller; and obtaining the respective angular position of the first flux reference frame ($\theta_2$) as $\theta_2=H_2*(\theta_r+\theta_s)$, where $H_2$ is the first induction order, $\theta_s$ is the slip position and $\theta_r$ is the rotor position, via the controller.

8. The method of claim 7, further comprising:

obtaining the respective angular position of the second flux reference frame ($\theta_3$) as: $\theta_3=[(H_3*\theta_r)-(2*\theta_{sl})]$, where $H_3$ is the second induction order, $\theta_{sl}$ is the slip position and $\theta_r$ is the rotor position, via the controller.

9. The method of claim 8, further comprising:

selecting the rotor bar order, the first induction order and the second induction order to have an identical value.

10. The method of claim 8, further comprising:

selecting the rotor bar order, the first induction order and the second induction order to have different values.

11. The method of claim 8, further comprising:

varying respectively a flux harmonics magnitude and a flux harmonics phase in the plurality of reference frames based on a commanded torque and a motor speed, via the controller.

12. An electric vehicle comprising:

an induction electric motor configured to generate torque for propulsion, the electric motor having a rotor and a stator;

a controller in communication with the induction electric motor and having a processor and tangible, non-transitory memory on which instructions are recorded for a method of suppressing tonal noises;

a pulse width modulated (PWM) inverter operatively connected to the controller;

wherein the controller is adapted to simultaneously inject flux harmonics through a respective voltage injection in a plurality of reference frames, including a rotor reference frame, a first flux reference frame and a second flux reference frame;

wherein the controller is adapted to generate a PWM signal based in part on the flux harmonics, the controller being adapted to control operation of the electric vehicle based on the PWM signal, including applying the PWM signal to the PWM inverter;

wherein the rotor reference frame is based in part on a rotor bar order and a rotor position of the rotor, the rotor bar order being defined as the ratio of a number of rotor bars in the rotor to the number of pole pairs;

wherein the controller is configured to obtain a respective angular position of the rotor reference frame ($\theta_1$) as $\theta_1=(H_1*\theta_r)$, where $H_1$ is the rotor bar order and $\theta_r$ is the rotor position;

wherein the first flux reference frame is based in part on a first induction order, the rotor position and a slip position;

wherein the second flux reference frame is based in part on a second induction order, the rotor position and the slip position;

wherein the first induction order and the second induction order are respective electrical harmonic orders associated with stator-induced electromagnetic excitations in the induction electric motor, the first induction order and the second induction order being selected based in part on a number of phases, stator slots and pole pairs in the induction electric motor; and wherein the controller is configured to obtain the respective angular position of the first flux reference frame ($\theta_2$) as $\theta_2=H_2*(\theta_r+\theta_s)$, where $H_2$ is the first induction order, $\theta_s$ is the slip position and $\theta_r$ is the rotor position.

13. The electric vehicle of claim 12, wherein the controller is configured to obtain the respective angular position of the second flux reference frame ($\theta_3$) as: $\theta_3=[(H_3*\theta_r)-(2*\theta_{sl})]$, where $H_3$ is the second induction order, $\theta_{sl}$ is the slip position and $\theta_r$ is the rotor position.

* * * * *